United States Patent Office 3,365,104
Patented Jan. 23, 1968

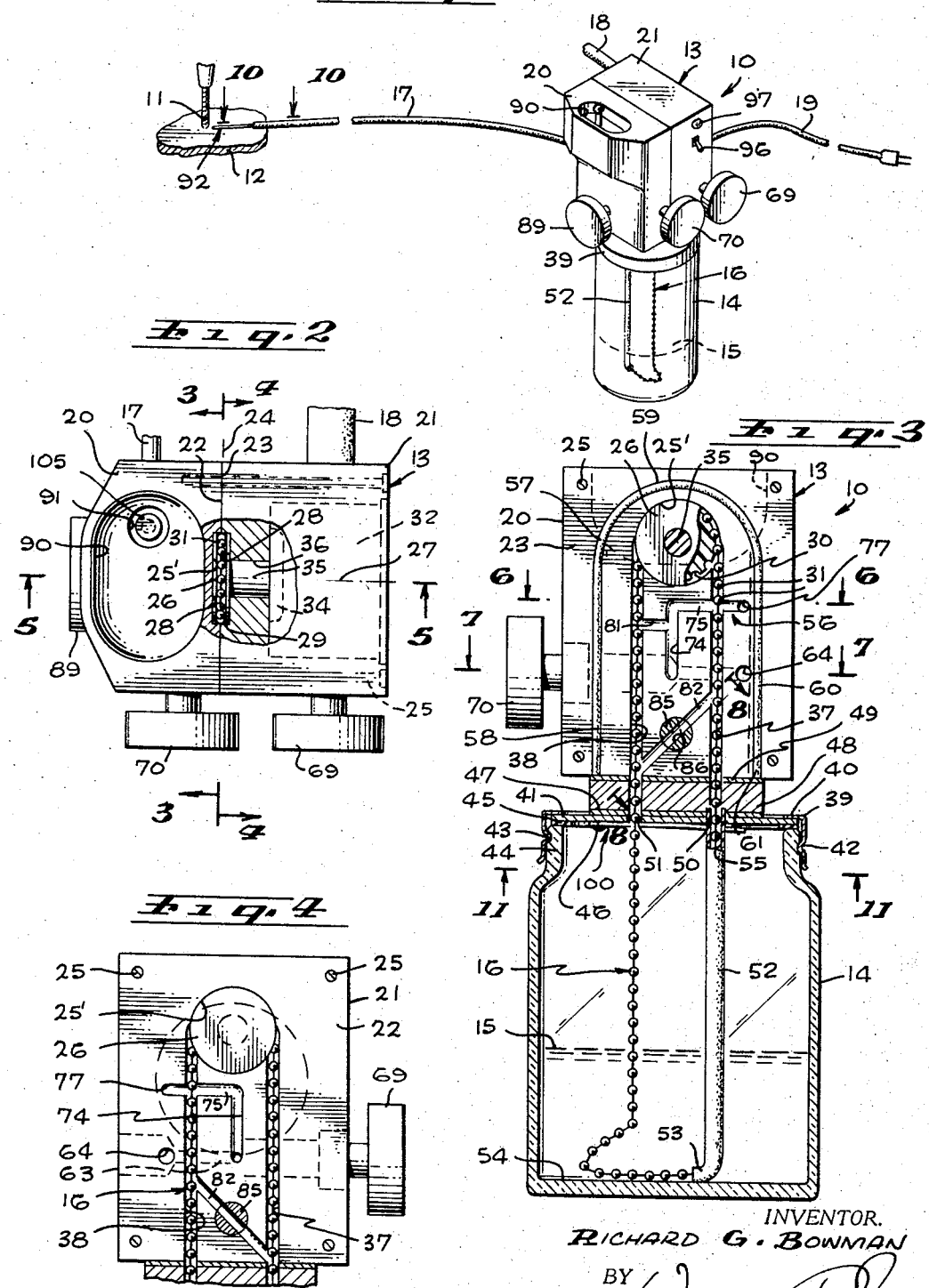

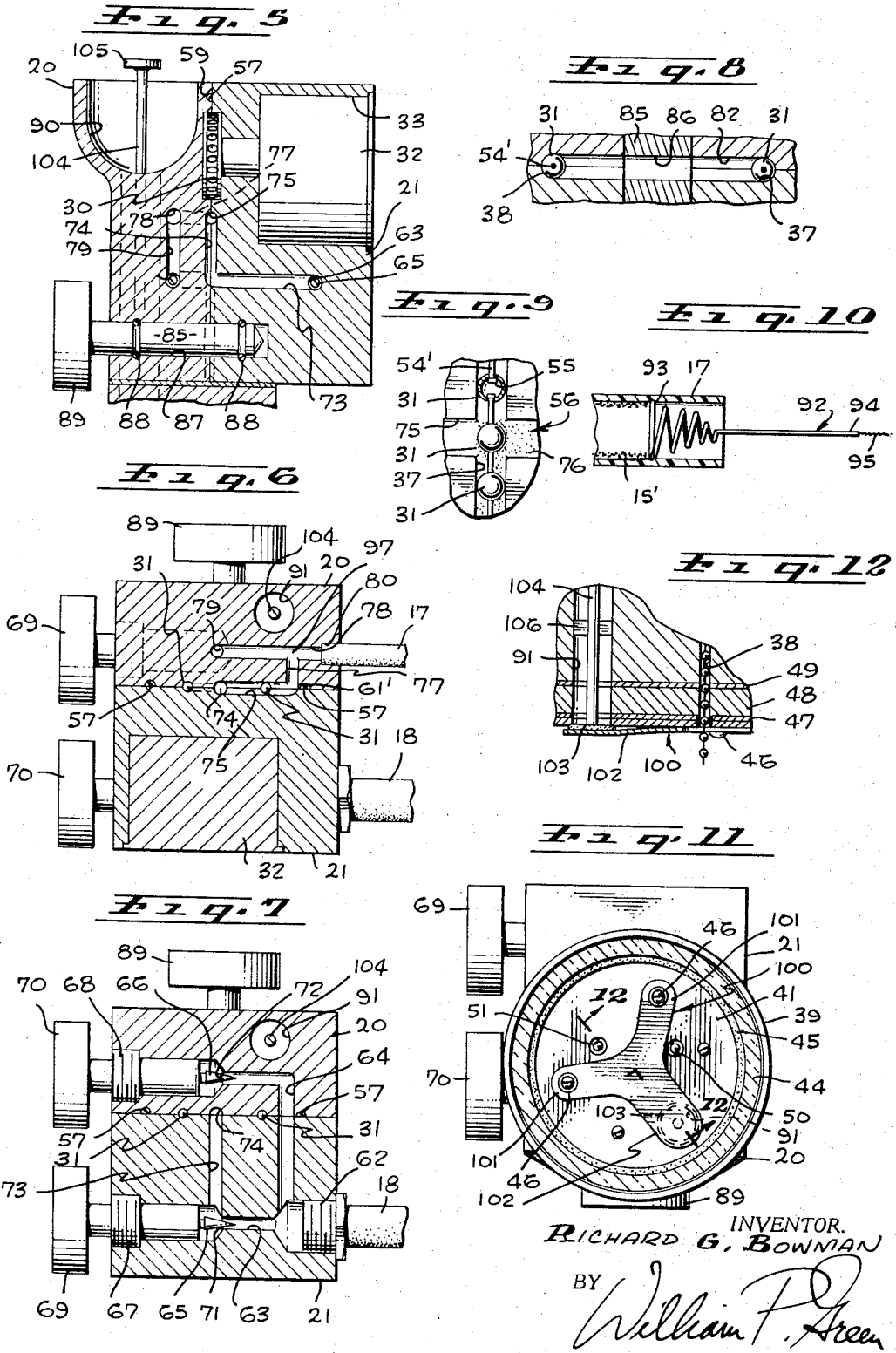

3,365,104
LIQUID DELIVERY APPARATUS
Richard G. Bowman, 7652 Bella Vista St.,
Los Angeles, Calif. 90045
Filed Apr. 20, 1966, Ser. No. 543,858
26 Claims. (Cl. 222—194)

ABSTRACT OF THE DISCLOSURE

A liquid delivery device including a container for holding a bottle of liquid, and an endless bead chain which is driven by a motor along an endless path to first advance upwardly from the liquid in a manner carrying some of the liquid with it, and then return downwardly back to the body of liquid. As the chain advances upwardly, a localized jet of air is directed against the chain at a velocity sufficient to blow the liquid from the chain. This air and carried liquid are then mixed at another location with a second stream of compressed air, and are delivered through a hose to a discharge location, with the two air streams being separately regulatable to vary both the rate of liquid transfer and the ratio of compressed air to liquid.

---

This invention relates to improved devices for transporting liquids between two different locations. Though the invention is considered broadly applicable to any of numerous situations in which it may be desirable to move a liquid from one point to another, or to apply a liquid to a predetermined work area, the invention will be described primarily as utilized for directing a liquid lubricant to a machine tool at the location at which a drill bit, cutter or the like is contacting a work piece.

Though various different types of equipment have been devised in the past for the purpose of applying a lubricant or coolant to the working element of a machine tool, there are many situations in which these previously developed units do not serve the desired purpose adequately. For instance, when the liquid to be dispensed is a very viscous or heavy material, it is found extremely difficult with conventional spraying equipment or the like to move the liquid from a tank or container to a desired point of application in a sufficiently positive manner to assure continuous and reliable application of the liquid to the working mechanism. Also, most of the previously developed devices have been incapable of reliably metering the rate of liquid transfer, or regulating or adjusting that rate of transfer within wide enough limits to satisfy any operating conditions encountered. Additionally, most of the prior art devices have been of the sprayer type, and as a result have dispersed the liquid over too wide an area, so that much of the liquid has blown past the working element without contacting it, and has therefore been completely ineffective as a lubricant.

A major object of the present invention is to provide a liquid transporting or applying unit which is capable of moving a liquid, such as a lubricant, very positively and reliably from one location to another, and in a manner desirably metering the liquid in uniform manner. A unit embodying the invention is adjustable within wide limits to vary the rate of lquid flow, but in any of its various settings will still meter the liquid reliably to continuously maintain a uniform rate of discharge. A further object of the invention is to provide an arrangement in which the transporting mechanism serves a secondary function of agitating or stirring the liquid in the storage chamber or reservoir from which that liquid is being taken, so that this continuous stirring will prevent separation of any of the components of the liquid, or settling out of any materials carried by the lubricant.

A more specific object of the invention is to preferably deposit the liquid at the dispensing location in the form of a narrow stream of liquid, rather than in spray form, so that this stream may be directed onto a drill bit or other working element in a manner assuring direct contact of all of the liquid with the working element and the work piece, and so that none of the lubricating effect is lost in the manner usually resulting from conventional spray application.

Structurally, a device embodying the invention may include a liquid carrying structure which is mounted for movement along a path extending from a predetermined liquid pick-up location to a second location, and is operable to carry liquid between those locations, together with means for directing a stream of air or other gas against the liquid at the "second location," to thereby displace the liquid by the gas from that second location. The carrier structure may be mounted for movement along an essentially endless path, to first pass through a container of liquid, then advance to the second location for deposit of the liquid at that location, and finally return to the container. After the liquid has been picked up from the carrier structure, and preferably blown off of that carrier structure by the gas stream, the liquid and gas may travel together to a second location at which another stream of gas may mix with the fluids to serve as the ultimate transporting medium for delivering the liquid to the desired discharge location. Appropriate adjustment of the two gas streams will afford a very wide range of regulation of the rate of liquid discharge, and the ratio of liquid to air or other gas.

Certain specific features of novelty reside in the formation of the carrier structure itself, whether or not that carrier structure may be utilized in conjunction with an air or gas stream. In particular, I may employ a carrier structure consisting of an elongated flexible unit having alternate enlargements and reduced areas, and desirably extending and moving within a conduit through which the liquid is transported mechanically by the carrier structure. The latter desirably consists of an elongated endless chain, preferably of the bead chain type.

For depositing the liquid on the working elements in the form of a narrow stream rather than spray form, I employ a discharge unit mounted within the end of a delivery tube, and having a portion received adjacent the side wall of the tube to receive the liquid as it flows along the side wall in laminar form. The discharge unit then advances radially inwardly relative to the side wall to ultimately discharge the liquid at a more localized or centralized point. For this purpose, the discharge unit may take the form of a simple coil which spirals progressively to a reduced diameter as it advances downstream, and may terminate in an essentially axially extending extremity at essentially the center of the conduit.

The above and other features and objects of the invention will be better understood from the following detailed description of the typical embodiment illustrated in the accompanying drawings, in which:

FIG. 1 is a perspective view of a lubricant applicator constructed in accordance with the invention;

FIG. 2 is an enlarged plan view of the FIG. 1 device;

FIG. 3 is a vertical section taken on line 3—3 of FIG. 2;

FIG. 4 is a fragmentary vertical section taken on line 4—4 of FIG. 2;

FIG. 5 is a fragmentary vertical section taken on line 5—5 of FIG. 2;

FIGS. 6 and 7 are horizontal sections taken on lines 6—6 and 7—7 respectively of FIG. 3;

FIG. 8 is a section on line 8—8 of FIG. 3;

FIG. 9 is a greatly enlarged fragmentary section taken in the plane of FIG. 3, and showing the manner in which the liquid is displaced from the carrier chain;

FIG. 10 is a section on line 10—10 of FIG. 1;

FIG. 11 is a bottom view of the device, taken on line 11—11 of FIG. 3, with the lubricant jar removed; and FIG. 12 is a section on line 12—12 of FIG. 11.

Referring first to FIG. 1, I have illustrated at 10 a liquid applicator constructed in accordance with the invention and typically designed for the purpose of applying a stream of liquid to a rotary drill bit 11 which is drilling a hole in a work piece 12. The applicator 10 includes a main body 13 to the underside of which there is removably connected a jar 14 containing a body of lubricant 15. An endless bead chain 16 extends downwardly from body 13 within jar 14, and acts to pick up the lubricant from the jar for ultimate discharge through a flexible hose or tube 17 onto the drill bit 11 and work piece 12. Compressed air is fed to body 13 through a supply hose 18, while electrical energy is fed to the device through a cord 19.

Body 13 is preferably formed of two complementary rigid body sections 20 and 21 having planar vertical surfaces 22 and 23 meeting in the vertical plane 24 of FIG. 2. The two sections 20 and 21 may be formed of appropriate metal, plastic, or the like, and are suitably secured together as by horizontal screws 25. Planar surfaces 22 and 23 contain near their upper ends opposed complementary recesses defining together a cylindrical compartment 25' (FIGS. 2 and 3) within which a chain driving sprocket wheel 26 is mounted for rotation about a horizontal axis 27. Compartment 25' is defined more specifically by two vertically extending parallel circular walls 28 disposed transversely of axis 27, and complementary cylindrical peripheral surfaces 29 also centered about axis 27. The sprocket wheel 26 may be dimensioned to occupy substantially the entire diameter of compartment 25', and has about its periphery a series of evenly circularly spaced notches or other irregularities 30 for receiving successive spherical beads or balls 31 of the endless flexible bead chain 16, in a relation such that rotation of wheel 26 acts to progressively advance the chain along its endless path. Sprocket wheel 26 is driven by an electric motor 32, energized through cord 19, and contained within a compartment 33 within body section 21. Motor 32 may be of a type containing an internal reduction gear assembly 34, so that its shaft 35, which extends through a passage 36 in body section 21, and which is connected to sprocket wheel 26, acts to drive the sprocket wheel at a relatively slow rate of rotation, say for example 10 revolutions per minute.

The sprocket wheel 26 turns in a counterclockwise direction as viewed in FIG. 3. In advancing upwardly to the sprocket wheel, chain 16 passes through a vertical cylindrical passage 37 which is formed and defined by two complementary semi-cylindrical vertical grooves formed in the opposed surfaces 22 and 23 of the two body sections. This passage 37 communicates at its upper end with the sprocket wheel receiving compartment 25', substantially tangentially, so that the chain may advance upwardly through passage 37 and then about the sprocket to then extend back downwardly toward the jar. In advancing downwardly at the opposite side of sprocket wheel 26, the chain passes through a second vertical cylindrical passage 38, which is again disposed tangentially with respect to the sprocket wheel and compartment 25', and which is formed by two opposed semicylindrical and complementary grooves provided in planar surfaces 22 and 23 of the body sections.

Jar 14 is removably connected to the underside of body 13 by means of a conventional jar lid ring 39, having an upper annular inturned flange 40 which bears downwardly against the upper side of the peripheral portion of a rigid circular horizontal metal plate 41. The ring 39 has threads 42 which are engageable with corresponding threads 43 formed in the upper neck portion 44 of the jar, to tighten the jar upwardly against an annular seal ring 45 formed of rubber or the like, to form a fluid tight seal between the parts. Plate 41 is connected to body 13 by means of a plurality of screws 46 (see FIGS. 3 and 11), which extend upwardly through registering apertures in plate 41, and in a first deformable circular seal disc 47, a thicker circular rigid spacer disc 48, and a second circular deformation seal disc 49, to ultimately connect upwardly into threaded bores formed in body sections 20 and 21 in a manner securing all of the parts 41, 47, 48 and 49 to the body in their FIG. 3 positions. As will be apparent, the enlarged heads at the lower ends of the screws bear upwardly against plate 41 to retain the parts together. Sealing discs 47 and 49 may typically be formed of an appropriate rubber or the like.

As will be apparent from FIG. 3, passages are formed at 50 and 51 in the various elements 41, 47, 48 and 49, which passages communicate with and form in effect extensions of the previously discussed chain receiving passages 37 and 38, so that the chain may pass from the upper body into the jar. Also, a tube 52 may have its upper end connected into one or more of the elements 41, 47, 48 and 49, as seen in FIG. 3, in frictionally retained relation, and may extend downwardly about the chain to the bottom of the jar 14, to form an additional continuation of the passage 37. Tubes 52 may be a flexible plastic material, and may have its lower end turned horizontally at 53 to direct the chain horizontally along the bottom surface 54 of the jar.

As mentioned previously, the chain is of a conventional type having a series of externally spherical hollow beads or balls 31 at spaced locations along the length of the chain (see FIG. 9). These normally metallic beads are articulately interconnected by short lengths of wire 54', having enlargements 55 within the beads for securing the wire lengths 54 to the beads. As will also be apparent from FIG. 9, the passage 37 through which the chain advances upwardly within the body is desirably of a diameter corresponding approximately to the external diameter of beads 31, so that the beads are fairly close fits within this passage to confine the liquid within the spaces between successive beads, in a manner causing the chain to advance the liquid upwardly. Similarly, the passage 55 within tube 52 is desirably of a diameter corresponding approximately to the external diameter of the beads, as are the portions of the passages 50 within elements 48 and 49 which are contacted by the beads. Thus, a continuous closely fitting conduit is provided about the chain along the entire length upwardly from the lower end of tube 52, at least to the liquid removal location designated 56 in FIGS. 3 and 9. Preferably, the rest of the passages 38 and 51 through which the chain extends also are of the same closely fitting internal diameter. If it is desired, that the capacity of the chain for pumping liquid upwardly be reduced, the various passages may be made less closely fitting, so that the liquid is advanced upwardly only by adherence to the chain, rather than by actual confinement within the inter bead spaces.

The tightly clamped seal discs 47 and 49 provide seals entirely about the chain at a location vertically between the jar and upper body 13. To supplement this sealing action, there is provided between body sections 20 and 21 an elongated deformable seal element 57 formed of rubbber or the like (FIG. 3), which follows the inverted U-shaped path indicated in FIG. 3 to extend first upwardly from one end 58 of seal element 57, and to then curve about the upper end of the chain at 59 to extend downwardly at 60 toward the second end 61 of element 57. This seal element 57 may be received within a semi-circular groove 61' (FIG. 6) formed in body section 20, and may engage the planar surface 22 of body section 21 to form a seal between these parts extending entirely about the upper side of the chain. Element 57 contacts seal disc 49 at the two ends 58 and 61 of element 57, to thus complete the seal with disc 49 and about the chain.

With reference now to FIG. 7, the compressed air supply hose 18 is connected into body section 21 at 62 and supplies air through two body passages 63 and 64 to a pair of needle valves 65 and 66 respectively. These needle valves are threadedly connected at 67 and 68 into the two body sections, and have knobs 69 and 70 accessible at the outside of the body for screwing the needle valves toward and away from their circular seats 71 and 72 formed in the body sections.

When needle valve 65 is in open condition, air is admitted by this valve from passage 63 into a communicating passage 73, which leads into the lower end of a vertical passage 74 formed by complementary opposed grooves in the two contacting faces of the body sections 20 and 21. From the upper end of this vertical cylindrical passage 74, the air enters a communicating horizontal cylindrical passage 75 formed by and between the sections (FIG. 3), which passage 75 intersects vertical chain receiving passage 37 in the manner illustrated in FIGS. 3 and 9. Thus, the air passes the chain and blows the lubricant carried by and between beads 37 from the chain into the right-hand continuation 76 of passage 75. From this passage 76, the mixed air and liquid flow through a horizontal passage 77 (FIG. 6) into a passage 78 which receives a second supply of air from the second needle valve 66. More particularly, the air which passes needle valve 66 passes upwardly through a passage 79 in body section 20 (FIG. 5), to thus flow into the left end of passage 78 as viewed in FIG. 6, to ultimately flow into discharge tube 17 whose end may be suitably connected in fixed position within an enlarged counterbore 80 formed at the end of passage 78.

For equalizing the pressure applied to the two vertically extending runs of chain 16, and thus equalizing the pressure between the liquid removal location 56 of FIG. 9 and the interior of jar 14, the previously discussed vertical passage 74 within the body structure is placed in communication with chain passage or conduit 38 through an additional passage designated 81 in FIG. 3. As will be apparent, though beads 31 of the chain may be fairly close fits within the conduits in the body and other parts, this fit is not close enough to prevent passage of air downwardly within passage 78 and past the various beads of the chain to the interior of jar 14, to maintain a pressure within that jar for counterbalancing the pressure applied to the other vertical run of the chain at 56.

If desired under some operating conditions, some of the liquid which is carried upwardly by the chain within passage 37 may be bypassed downwardly from that passage to a lower portion of passage 38 through a desirably inclined cross passage 82 (FIG. 3), into which there may be connected an appropriate shutoff or regulating valve 85, which may typically take the form of a rotary plug valve having a passage 86 through which fluid may flow in the full line position of FIG. 3, but which closes off fluid flow through passage 82 in the broken line position of that figure. This valve 85 may be contained within an appropriate cylindrical passage 87 in the body sections, and may be annularly sealed with respect to the body sections by O-rings 88 or otherwise, and be actuable by an appropriate knob or handle 89 at the outside of the body.

Lubricant may be filled into jar 14 through a funnel like recess 90 formed in the upper end of body section 20 (FIGS. 2 and 5), the bottom of which recess may communicate with a vertical passage 91 extending downwardly through body section 20 and through registering and sealed apertures in parts 49, 48, 47 and 41, so that the liquid from recess 90 may flow into the jar.

If the liquid is of substantial viscosity, it will normally flow through discharge hose or tube 17 in a laminar flow pattern, that is, in a manner forming a layer 15′ of the lubricant (FIG. 10) clinging to the inner wall surface of tube 17. To convert this laminar flow to a needle like stream of the lubricant, I mount within the interior of the discharge portion of tube 17 a spirally shaped lubricant director element 92, which may be formed of somewhat resilient spring material, and which has an enlarged diameter initial portion 93 contacting and secured in fixed position relative to the inner wall surface of tube 17. This portion 93 of element 92 may for example be located merely by forming it to be a very tight fit within the somewhat flexible and somewhat expansible tube 17, to thus form confining grooves within the inner wall surface of tubes 17 in the manner illustrated in FIG. 10. In advancing rightwardly or in a downstream direction from the enlarged diameter portion 93 of element 92, this element progressively spirals in the manner illustrated in FIG. 10, so that as it advances downstream and circularly, the element 92 also advances radially inwardly to a progressively reduced diameter, and to ultimately reach an extremity of element 92 which is desirably centered with respect to the cylindrical wall of tube 17, and may extend axially with respect to and outwardly beyond that tube. The lubricant 15′ then tends to follow the spiraling element 92, by virtue of the adhesion of the lubricant to this element, so that the lubricant advances to the center of tube 17, and ultimately discharges from the end of portion 94 of the element in the form of a thin needle like stream 95 of lubricant which may be aimed directly onto the drill bit 11 or work piece 12 of FIG. 1.

To now describe the operation of the discussed unit, an operator may first fill a desired liquid into jar 14 by pouring the liquid into the upper recess 90 of the body, to flow downwardly through passage 91 into the jar. Next, discharge tube 17 may be appropriately mounted to direct element 94 toward the spot to be lubricated, while air supply hose 18 and cord 19 may be conected to appropriate sources of compressed air and electricity. The motor 32 may then be enegized by actuation of a control switch 96 (FIG. 1), to commence rotation of sprocket wheel 26 in a manner progressively advancing chain 16 upwardly through tube 52 of FIG. 3, and then upwardly through passage 37, to ultimately pass downwardly through passage 38 and back to jar 14. The motor is a constant speed motor which drives the sprocket wheel and chain at a relatively slow speed so that liquid is carried upwardly by the chain within tube 52 and passage 37 to location 56 at a uniform and reliable metering rate.

If needle valve 65 is open, air may flow from supply hose 18 to passage 75 of FIG. 3, to thus blow past the chain at the location 56, in a manner removing the liquid from the chain and directing it into right-hand extension 76 of passage 75. Thus, there is provided in effect at the location 56 an air-liquid mixing chamber, in the form of a blowoff chamber. This mixture may be combined with additional compressed air from needle valve 66 at the location of a second mixing chamber designated 97 in FIG. 6, to ultimately discharge into and through tube 17, and be directed in the previously discussed manner by element 92 of FIG. 10 onto elements 11 and 12 of FIG. 1 in the form of a thin stream of liquid. The amount of liquid fed to the parts being lubricated may be controlled by adjustment of valve 65, while the amount of air may be adjusted by regulating this valve and the second valve 66, so that the two valves together provide a very wide latitude of adjustment for regulating the delivery conditions at the ultimate discharge point. Additional adjustment is provided by regulation of by-pass valve 85, and by regulation of the speed of motor 32 by means of a speed control unit diagrammatically illustrated at 97 in FIG. 1. The continuous movement of chain 16 within the body of liquid 15 in jar 14, and particularly along the bottom wall 54 of jar 14, stirs the liquid in a manner preventing separation of any of its components, and preventing the accumulation of sediment in the bottom of the jar.

In order to prevent the escape of pressurized air from jar 14 through passage 91 and the upper funnel-like recess 90 during operation of the device, I preferably provide a flapper valve element 100 (FIGS. 11 and 12), at the underside of plate 41 (FIGS. 3 and 12), acting to normally close the lower end of passage 91. Valve element 100 may take the form of a leaf spring formed of horizontally extending sheet material, having the outline configuration brought out in FIG. 11, to form two arms 101 which are rigidly secured by two of the screws 46 to plate 41. A third arm or portion 102 of the leaf spring may have secured to its upper side a circular deformable valving disc 103 (FIG. 12) formed of rubber or the like, which may typically be vulcanized or otherwise bonded to the upper side of the spring element 100. The resilience of spring valve element 100 yieldingly urges disc 103 upwardly into closing and sealing relation with respect to passage 91, to form the desired fluid tight closure between that passage and the interior of jar 14. During filling, valve element 100 and its sealing disc 103 may be manually actuated downwardly by means of a push rod 104, which extends upwardly through passage 91 and carries an enlargement 105 accessible at the top of the body for manual depression to actuate the valve element downwardly to open position. Push rod 104 may of course be centered and guided for only vertical movement within the passage 91 by any suitable centering or guiding means, such as one or more spider or guide structures as typically represented at 106 in FIG. 12.

I claim:

1. An applicator comprising a liquid carrier structure mounted for movement along a path extending from a predetermined liquid pick-up location to a second location and operable to carry liquid between said locations, means for directing a stream of gas against said liquid at said second location and thereby displacing the liquid by said gas from said second location to a third location, and means for directing a second stream of gas against said liquid at said third location and thereby displacing the liquid by said second gas stream from said third location to a fourth location.

2. An applicator comprising a liquid carrier structure mounted for movement along a path extending from a predetermined liquid pick-up location to a second location and operable to carry liquid between said locations, means for directing a stream of gas against said liquid at said second location and thereby displacing the liquid by said gas from said second location to a third location, means for directing a second stream of gas against said liquid at said third location and thereby displacing the liquid by said second gas stream from said third location to a fourth location, and means for separately adjusting said two streams of gas to vary both the rate of liquid transfer and the ratio of gas to said transferred liquid.

3. An applicator comprising a liquid carrier structure mounted for movement along a path extending from a predetermined liquid pick-up location to a second location and operable to carry liquid between said locations, means for directing a stream of gas against said liquid at said second location and thereby displacing the liquid by said gas from said second location, a container for holding said liquid at said first location, means defining a conduit for conducting liquid from said container to said second location, said carrier structure including a flexible endless bead chain received within said conduit and movable along an endless path from said container to said second location, through said conduit, and then back to said pick-up location, a motor for driving said chain along said endless path, a valve for regulating the flow of gas against said liquid at said second location, conduit means directing said gas and liquid from said second location to a third location, means directing a second stream of gas against said liquid at said third location and including a second valve for regulating the flow of said second stream, and flexible conduit means for conducting said liquid and gas from said third location to a delivery point.

4. An applicator comprising a container for holding a body of liquid, an endless flexible carrier structure mounted for longitudinal movement along an endless path from a predetermined first location at which it is in contact with said body of liquid to a second location, and then back to said first location, said carrier structure being operable to pick up liquid from said body of liquid at said first location and carry it to said second location, means for driving said carrier structure along said endless path, to transport said liquid between said locations, means for directing against said carrier structure at said second location a localized jet of rapidly moving gas of a velocity acting to blow said liquid off of the carrier structure, by the force of said gas, and means including an elongated conduit for receiving said liquid blown from the carrier structure, and conducting it to a predetermined discharge location.

5. An applicator as recited in claim 4, in which said carrier structure is an endless bead chain having alternate enlarged and reduced transverse dimension portions.

6. An applicator as recited in claim 4, in which said localized jet of gas is directed against only a small fraction of the length of said carrier structure.

7. An applicator as recited in claim 4, in which said carrier structure advances upwardly from said body of liquid and through the upper surface thereof to a level above said surface in advancing from said first location to said second location.

8. An applicator as recited in claim 4, in which said carrier structure has a portion within said body of liquid which is unrestrained against bodily shifting movement in addition to said longitudinal movement and which can therefore function by such movement to agitate the liquid.

9. An applicator as recited in claim 4, including a tube extending upwardly from said body of liquid and containing and confining said carrier structure as it moves upwardly toward said second location, said carrier structure having a portion in advance of said tube which is free for bodily shifting movement within the liquid in addition to said longitudinal movement.

10. An applicator as recited in claim 4, including means defining a fill passage through which liquid is filled into said container, and a valve for closing said fill passage against the escape of gas therethrough from the container.

11. An applicator as recited in claim 4, including a body structure above said container having passage means formed therein through which said carrier structure advances upwardly from the container and then downwardly back into the container, said driving means including a motor driven wheel in said body structure for engaging and driving the endless carrier structure, said means for directing said jet of gas including additional passage means formed in said body structure and intersecting said first mentioned passage means at said second location and acting to direct compressed gas past the carrier structure to blow off said liquid, and valve means for regulating the flow of gas in said additional passage means.

12. An applicator as recited in claim 11, including further passage means in said body structure directing an additional stream of compressed gas into admixture with said first jet of gas and carried liquid at a third location beyond said second location, and valve means for regulating the velocity of said additional stream of compressed gas.

13. An applicator as recited in claim 12, in which said body structure forms at its underside a cap for closing the top of said container and threadedly and detachably connectible to the container.

14. An applicator as recited in claim 13, in which said body structure forms a filling receptacle into which liquid may be poured and communicating downwardly through a fill passage in the body structure with said container to fill liquid thereinto, and a fill valve element for closing off said fill passage and having an actuating rod extending downwardly through said fill passage and accessible at the top of the body structure to actuate said fill valve element.

15. An applicator as recited in claim 11, in which said body structure forms at its underside a cap for closing the top of said container and detachably connectible to the container.

16. An applicator as recited in claim 4, in which said conduit is an elongated flexible line adapted to be deformed to different shapes for delivery of liquid to different discharge locations.

17. An applicator as recited in claim 4, including means for introducing an additional stream of rapidly moving gas into admixture with said first mentioned jet and carried liquid at a third location beyond said second location.

18. An applicator as recited in claim 4, including means for introducing an additional stream of rapidly moving gas into admixture with said first mentioned jet and carried liquid at a third location beyond said second location, and two valves individually adjustable to regulate said stream and said jet respectively.

19. An applicator as recited in claim 4, including a valve for regulating the velocity of said jet of gas.

20. An applicator as recited in claim 4, in which said driving means include a wheel for engaging and driving said endless carrier structure, and a variable speed motor driving said wheel.

21. An applicator comprising a container for holding a body of liquid, an endless flexible carrier structure mounted for longitudinal movement along an endless path from a predetermined first location at which it is in contact with said body of liquid to a second location, and then back to said first location, said carrier structure being operable to pick up liquid from said body of liquid at said first location and carry it to said second location, means for driving said carrier structure along said endless path, to transport said liquid between said locations, and means for directing a stream of gas against said liquid at said second location and thereby displacing the liquid by said gas from said second location, said carrier structure in advancing from said first location to said second location being directed to extend upwardly to a level above the normal level of said body of liquid in said container and to lift said liquid above said normal level, to thereby prevent leakage of liquid by gravity along said carrier structure from said first location to said second location.

22. An applicator as recited in claim 21, in which said endless carrier structure has a first run advancing upwardly through a first passage from said first location to said second location and has a second run then advancing downwardly through a return passage to said body of liquid, there being a by-pass passage from said first passage to said return passage, and valve means for regulating the flow of liquid through said by-pass passage.

23. An applicator as recited in claim 21, in which said endless carrier structure has a first run advancing from said first location to said second location and a second run advancing through a return passage from said second location back to said first location, there being means for introducing gas under pressure to said return passage to counterbalance the tendency for gas to flow back along said first run to said container.

24. An applicator as recited in claim 21, in which said endless carrier structure has a first run advancing upwardly through a first passage from said first location to said second location and has a second run then advancing downwardly through a return passage to said body of liquid, there being a by-pass passage from said first passage to said return passage, and valve means for regulating the flow of liquid through said by-pass passage, said gas jet being directed against said first run at a location above said by-pass passage, and there being another passage for introducing gas under pressure to said return passage at a location above said by-pass passage.

25. An applicator comprising a container for holding a body of liquid, an endless flexible carrier structure mounted for longitudinal movement along an endless path from a predetermined first location at which it is in contact with said body of liquid to a second location, and then back to said first location, said carrier structure being operable to pick up liquid from said body of liquid at said first location and carry it to said second location, means for driving said carrier structure along said endless path, to transport said liquid between said locations, and means for directing a stream of gas against said liquid at said second location and thereby displacing the liquid by said gas from said second location, said carrier structure having a portion within said body of liquid which is free for bodily shifting movement in addition to said longitudinal movement and which agitates the liquid as the carrier structure moves.

26. An applicator comprising a container for holding a body of liquid, an endless flexible carrier structure mounted for longitudinal movement along an endless path from a predetermined first location at which it is in contact with said body of liquid to a second location, and then back to said first location, said carrier structure being operable to pick up liquid from said body of liquid at said first location and carry it to said second location, means for driving said carrier structure along said endless path, to transport said liquid between said locations, and means for directing against said carrier structure at said second location a localized jet of rapidly moving gas of a velocity acting to blow said liquid off of the carrier structure by the force of said gas.

References Cited

UNITED STATES PATENTS

| | | | |
|---|---|---|---|
| 2,818,200 | 12/1957 | Webb et al. | 222—194 |
| 2,828,892 | 4/1958 | Ward | 222—402.16 |
| 3,178,255 | 4/1965 | Neuwald et al. | 222—365 |
| 3,279,658 | 10/1966 | Dinges | 222—194 |

FOREIGN PATENTS

| | | |
|---|---|---|
| 895,544 | 11/1953 | Germany. |
| 59,345 | 9/1922 | Sweden. |

ROBERT B. REEVES, *Primary Examiner.*

HADD S. LANE, *Assistant Examiner.*